United States Patent [19]
Ando et al.

[11] Patent Number: 5,567,368
[45] Date of Patent: Oct. 22, 1996

[54] EXTRUSION MOLDING METHOD AND EXTRUSION MOLDING APPARATUS

[75] Inventors: Yukimasa Ando; Katsutomi Kishino, both of Obu, Japan

[73] Assignee: Tokai Kogyo Kabushiki Kaisha, Obu, Japan

[21] Appl. No.: 424,352

[22] PCT Filed: Dec. 27, 1993

[86] PCT No.: PCT/JP93/01906

§ 371 Date: Apr. 26, 1995

§ 102(e) Date: Apr. 26, 1995

[87] PCT Pub. No.: WO95/06557

PCT Pub. Date: Mar. 9, 1995

[30] Foreign Application Priority Data

Aug. 31, 1993 [JP] Japan .................................. 5-216145

[51] Int. Cl.⁶ .................................................. B29C 47/92
[52] U.S. Cl. ................ 264/40.1; 264/40.5; 264/40.7; 264/167; 264/177.19; 425/140; 425/145; 425/149; 425/162; 425/172
[58] Field of Search ............................ 264/40.1, 40.5, 264/40.7, 167, 177.16–.20, 177.10; 425/145, 466, 141, 140, 149, 162, 172

[56] References Cited

U.S. PATENT DOCUMENTS

| | | | |
|---|---|---|---|
| 4,754,413 | 6/1988 | Koster et al. | 264/40.7 |
| 5,167,893 | 12/1992 | Yada et al. | 264/177.16 |
| 5,362,428 | 11/1994 | Tsujino et al. | 264/40.5 |
| 5,395,563 | 3/1995 | Goto et al. | 264/40.7 |
| 5,433,808 | 7/1995 | Yada et al. | 264/177.17 |
| 5,441,688 | 8/1995 | Goto et al. | 264/177.16 |
| 5,445,780 | 8/1995 | Yada et al. | 264/177.16 |
| 5,447,670 | 9/1995 | Ito et al. | 264/40.5 |

FOREIGN PATENT DOCUMENTS

| | | | |
|---|---|---|---|
| 63-82707 | 4/1988 | Japan | 264/40.5 |
| 4-303617 | 10/1992 | Japan | 264/167 |
| 4-356216 | 12/1992 | Japan . | |
| 5-104605 | 4/1993 | Japan . | |
| 5-104604 | 4/1993 | Japan . | |
| 5-154890 | 6/1993 | Japan | 264/167 |
| 2177819 | 1/1987 | United Kingdom | 264/40.7 |

*Primary Examiner*—Jeffery R. Thurlow
*Attorney, Agent, or Firm*—Dennison, Meserole, Pollack & Scheiner

[57] ABSTRACT

In the present invention, a preliminary extruding operation is carried out for each section of a movable die moving pattern DA corresponding to the configuration of an article, thereby determining a suitable back pressure at which a desired cross-sectional dimension is obtained. The movable die is secured to a position DA1 corresponding to a side section of the article, then screw revolutions are changed while extruding a molding material. Thus, determined as a suitable back pressure BPO for the side section is a specified value of the back pressures BP at which the molded product has the desired cross-sectional dimension. Likewise, a suitable back pressure for the upper section is also determined, so that a pattern of the suitable back pressures BPO is determined. In view of the time delay, timings of change in an initial setting pattern R1 for the screw revolutions are advanced for periods of times $T_{11}, T_{12}, T_{13}$ and $T_{14}$ from the timings of change in the pattern DA. In the present extruding operation, an actual pulling speed is detected. If the actual pulling speed is different from a pulling speed in the preliminary extruding operation, the movable die moving pattern DA is corrected. After several cycles of extrusion molding are carried out, if the detected back pressures BP are deviated from the pattern of the suitable back pressures BPO, the pattern R1 of the screw revolutions is modified.

8 Claims, 15 Drawing Sheets

5,567,368

EXTRUSION MOLDING METHOD AND EXTRUSION MOLDING APPARATUS

TECHNICAL FIELD

The present invention relates to an extrusion molding method for manufacturing a molded article of which the cross-sectional configuration is longitudinally modified, more particularly for manufacturing a good molded article which has no dimensional error, no variation in quality and the like.

BACKGROUND ART

To manufacture an elongated rubber product, an extrusion molding method has been used. The extrusion molding method is a molding method in which a molding material such as rubber, PP (polypropyrene) and PVC (polyvinyl chloride) is molded into a desired configuration by extruding the molding material from an extrusion nozzle (die) having an opening corresponding to the configuration of a molded article under pressure while kneading and plasticizing the molding material with a screw.

When the article has a uniform cross-sectional configuration, the molding material may be continuously extruded from an invariant die having a definitely configured opening. However, in manufacturing the extrusion molded article of which the cross-sectional configuration is longitudinally modified, the configuration and the area of the die opening must be changed to conform to the cross-sectional configuration of the molded article.

An example of such an extrusion molded article is a weather strip for an automobile body shown in FIG. 9(A), FIG. 9(B), FIG. 9(C) and FIG. 10.

As shown in FIG. 9(A), the weather strip 50 is mounted along a circumferential edge of a windshield 42 of the automobile body 40. The weather strip 50 includes side sections 52 extending along both sides of the windshield 42 and an upper section 54 extending along an upper edge of the windshield 42 and is integrally molded by extrusion molding, as shown in FIG. 10.

As shown in a sectional view of FIG. 9(B), the side section 52 has a cross-sectional configuration centrally provided with a partition wall 52a to prevent flowing of rainwater toward side surfaces of the automobile body 40. On the other hand, as shown in FIG. 9(C), the upper section 54 does not include such a partition wall and has a cross-sectional configuration smaller than that of the side section 52. Therefore, in extrusion molding of the weather strip 50, the cross-sectional configuration must be changed during a single molding process (1 cycle) for one piece of the molded article, as shown in FIG. 10.

To this end, as shown in FIG. 11, a movable die 208 is provided on a die 204 of an extrusion molding machine 201, which may change the configuration of a die opening 210. The movable die 208, although not illustrated in detail in FIG. 11, is constituted of two movable die halves which are movable in a direction crossing at right angles relative to each other. One of the movable die halves, when positioned, defines the top-to-bottom dimension in FIGS. 9(B) and 9(C). The other of the movable die halves, when positioned, defines the configuration of the right-to-left constricted portion in FIGS. 9(B) and 9(C).

The construction of the extrusion molding machine including such two movable die halves is identical with that described in previous patent applications, for example, Japanese Laid-Open Patent Publication No. 4-356216.

The position of the movable die 208 is moved by a control mechanism (not shown) in synchronous with an extruding operation of an extrusion screw S so that the configuration of the die opening 210 is changed between the cross-sectional configuration 52 in FIG. 9(B) and the cross-sectional configuration 54 in FIG. 9(C).

Thus, as shown in FIG. 10, the weather strip 50 is formed in which the cross-sectional configuration thereof is modified for a desired length.

Now, in manufacturing an extrusion molded article such as the weather strip 50 of which the cross-sectional configuration is modified, it is important to constantly form the molded article which has no variation in quality and which has a desired dimension of cross-sectional configuration at each section thereof. For this purpose, the molding material has to be controlled to be stably extruded in proper amounts for each section having a different cross-sectional configuration.

However, in the extrusion molding of such an article, the area of the die opening 210 changes since the movable die 208 is moved to conform to the cross-sectional configuration of the molded article. This may vary of inner pressures of the fixed die (hereinafter referred to as "back pressures") applied to the molding material to be extruded, and amounts of the molding material extruded from the die opening 210 and the like.

Such variations in the back pressures and the amounts of the molding material to be extruded may cause variations in the magnitude of expansion of the molding material (die swelling) which may be caused when it is released from the back pressures upon being extruded from the die opening, and may in turn lead to errors of the cross-sectional dimensions of the article.

Then, in order to preclude the variations in the back pressures and the amounts of the molding material to be extruded for manufacturing the extrusion molded article having desired cross-sectional dimensions, many kinds of extrusion molding methods have been developed.

Such extrusion molding methods are described in, for example, Japanese Laid-Open Patent Publication No. 5-104604 entitled "Method and Apparatus for Manufacturing Weather Strip" and Japanese Laid-Open Patent Publication No. 5-104605 entitled "Method for Manufacturing Weather Strip".

The technique described in the former Publication relates to a method to detect the variations in the back pressures adjacent to the extrusion die due to changes in the area of the die opening for controlling an opening degree of back pressure control bore. In this method, when the back pressures are increased upon reduction of the area of the die opening, a control is carried out so that an opening degree of the back pressure control bore is increased for releasing an excess of molding material.

As a result, a suitable amount of molding material is extruded from the die opening, and the back pressures applied on the molded body may also fall within a suitable back pressure range. This may prevent the dimensional errors in the extrusion molded article due to variations in the die swelling.

The technique described in the latter Publication relates to a method to detect the variations in the back pressures adjacent to the extrusion die due to changes of the area of the die opening for controlling revolutions of an extrusion screw based on values of the back pressures thereby controlling extrusion pressures of the molding material.

In this method, the screw revolutions are not necessarily controlled to keep the back pressures constant, and are controlled in such a manner that the back pressures correspond to desired values best suited to the cross-sectional configuration at each section of the molded article.

As a result, undesirable variations in the back pressures are prevented and variations in the cross-sectional dimensions of the molded article due to the die swelling are restricted, so that the cross-sectional dimensions of the molded article are controlled.

However, the method to control the back pressure by releasing the molding material through the back pressure control bore wastes the molding material released therethrough and increases production costs of the article.

Further, in the method in which the screw revolutions are feedback controlled on the basis of the variations in the back pressures, the following problems arise because of time delays as shown in FIGS. 12(A) and 12(B).

FIG. 12(A) is a chart showing the changes of the back pressures adjacent to the die opening 210 and head pressures in the vicinity of the forward end of the extrusion screw S upon operation of the movable die 208 shown in FIG. 11. Alternatively, FIG. 12(B) is a chart showing the changes of the back pressures and the head pressures at the time when the revolutions off the extrusion screw S are changed.

Further, the back pressures and the head pressures are determined by a pressure sensor 206 positioned adjacent to the die opening 210 of an extrusion molding machine 201 and a pressure sensor 228 positioned adjacent to the forward end of the extrusion screw S, respectively.

As shown in FIG. 12(A), as the movable die 208 is moved to increase the area 60 of the die opening 210, the back pressures 62 adjacent to the die opening 210 are immediately decreased, whereas the head pressures 64 are decreased with a time delay $T_{51}$.

This is because a considerable time is required to propagate changes of pressures from the area adjacent to the die opening 210 that creates the back pressure to the extrusion screw S because of the distance therebetween. Similarly, as the movable die 208 is moved to decrease the area 60 of the die opening, the head pressures 64 are increased with a time delay $T_{52}$.

Likewise, a considerable time is required to propagate changes of pressures from the forward end of the extrusion screw S to the die opening 210. Therefore, as shown in FIG. 12(B), the back pressures 62 are changed with time delays $T_{53}$ and $T_{54}$ where the screw revolutions 66 are changed.

For the reasons above, in the conventional method in which the screw revolutions are controlled by the feedback controlling, a problem as shown in FIG. 13 arises. Further, the control for the extrusion molding shown in FIG. 13 is an exemplary method in which it is intended to keep the back pressures constant for obtaining a good molded article.

In this control, there exist time delays $T_{55}$ and $T_{56}$ since changes 68 of the back pressures 62 due to the changes of the area 60 of the die opening are determined at a point adjacent to the die opening before controlling the screw revolutions 66. The time delays $T_{55}$ and $T_{56}$ may produce variations 70 and 72 of the back pressures. Consequently, the back pressures 62 can not be maintained constant. Such variations 70 and 72 of the back pressures have caused a problem of producing the errors of the cross-sectional dimensions or variations in quality of the molded product.

SUMMARY OF THE INVENTION

Accordingly, the present invention proposes an extrusion molding method which may stably produce a good extrusion molded article having a desired cross-sectional configuration and exhibiting no variation in quality without waste of a molding material.

(1) A first embodiment is an extrusion molding method performed by utilizing an extrusion molding machine having a die which may change the configuration of a die opening, and an extrusion device for extruding a molding material into the die, characterized in that the method includes a providing step for previously determining an allowable value of a physical value for the molding material in the die in accordance with the configuration of the die opening; and an extrusion molding step for extruding the molding material while controlling the extrusion device for obtaining the allowable value as determined in the providing step.

According to this extrusion molding method, in the providing step prior to the extrusion molding step, the allowable value of the physical value for the molding material in the die is previously determined. The physical value may act as a basis for evaluating as to whether the quality of the extrusion molded article produced by the extrusion molding falls within a suitable range. So, the extrusion molding is performed while controlling the extrusion device for obtaining the allowable value.

This may stably produce a good extrusion molded article having a desired cross-sectional configuration and exhibiting no variation in quality without waste of a molding material.

(2) A second embodiment is characterized in that in the extrusion molding method according to the first invention, the extrusion capacity of the extrusion device is increased or decreased before changing the configuration of the die opening.

This method may cancel a time delay due to a considerable time required to propagate a change of the extrusion force of the extrusion device to the die, thereby adequately controlling a molding condition. This may stably produce a good extrusion molded article having a desired cross-sectional configuration and exhibiting no variation in quality.

(3) A third embodiment is characterized in that in the extrusion molding method according to the first or second invention, the extrusion device is controlled by changing revolutions of an extrusion screw contained in the extrusion device.

This method may rapidly and accurately control an extrusion condition of the extrusion device by changing the revolutions of the extrusion screw, thereby permitting more accurate control thereof.

(4) A fourth embodiment is characterized in that in the extrusion molding method according to the third invention, the physical values previously determined by changing the revolutions of the extrusion screw under a predetermined timing for obtaining a time lag between a timing of change of the screw revolutions and a timing of change of the physical value, and the extrusion device is controlled at a period of the time lag before changing the configuration of the die opening.

Thus, this method may change the physical value at a suitable timing since the extrusion device is controlled at the period of the predetermined time lag between the timing of change of the screw revolutions and the timing of change of the physical value before changing the configuration of the die opening. This may stably produce a good extrusion molded article having an extremely accurate cross-sectional configuration.

(5) A fifth embodiment is characterized in that in the extrusion molding method according to the first, second, third or fourth invention, the physical value is an inner pressure (hereinafter referred to as a "back pressure") of the die.

The back pressure is a value which changes directly depending on the extruded volume of the molding material, and a suitable value of the back pressure is determined in accordance with the configuration of the die opening. So, the extrusion molding is performed while controlling the extrusion device for obtaining the suitable value of the back pressure. This may produce a good extrusion molded article having a desired cross-sectional configuration with a high precision. (6) A sixth embodiment is characterized in that in the extrusion molding method according to the first, second, third, forth or fifth invention, the allowable value of the physical value is changed in accordance with the change of the configuration of the die opening.

The allowable value of the physical value, depending on the type of the physical value, may change where the configuration of the die opening is changed. Therefore, by changing the allowable value of the physical value in accordance with the change of the configuration of the die opening, the extrusion device can be more accurately controlled. (7) A seventh embodiment is characterized in that the extrusion molding method according to the first invention further includes an additional step for detecting the physical value during the extrusion tool cling step and correcting the control factor of the extrusion device so that the physical value as detected is equal to the allowable value.

This method may accurately control the physical value within the allowable value if the physical value is slightly deviated from the allowable value, thereby permitting more accurate control.

(8) An eighth embodiment is an extrusion molding machine having a die which may change the configuration of a die opening, and an extrusion device for extruding a molding material into the die, characterized in that the machine includes allowable value setting means for previously setting an allowable value of a physical value for the molding material in the die, the allowable value being determined in accordance with the configuration of the die opening; and extrusion device control means for controlling the extrusion device so as to obtain the allowable value set in the allowable value setting means.

According to this extrusion molding machine, the allowable value of the physical value for the molding material in the die is previously determined by means of the allowable value setting means. The physical value may act as a basis for evaluating as to whether the quality of the extrusion molded article produced by the extrusion molding falls within a suitable range. So, the extrusion molding is performed while controlling the extrusion device for obtaining the allowable value by means of the extrusion device control means.

This may stably produce a good extrusion molded article having a desired cross-sectional configuration and exhibiting no variation in quality without waste of a molding material.

DESCRIPTION OF THE PREFERRED EMBODIMENT

<First Embodiment>

Now, a first embodiment embodying the present invention will be explained with reference to FIGS. 1 to 3. An extrusion molding method of this embodiment is performed by an extrusion molding machine 101 shown in FIG. 1.

Figure 1:
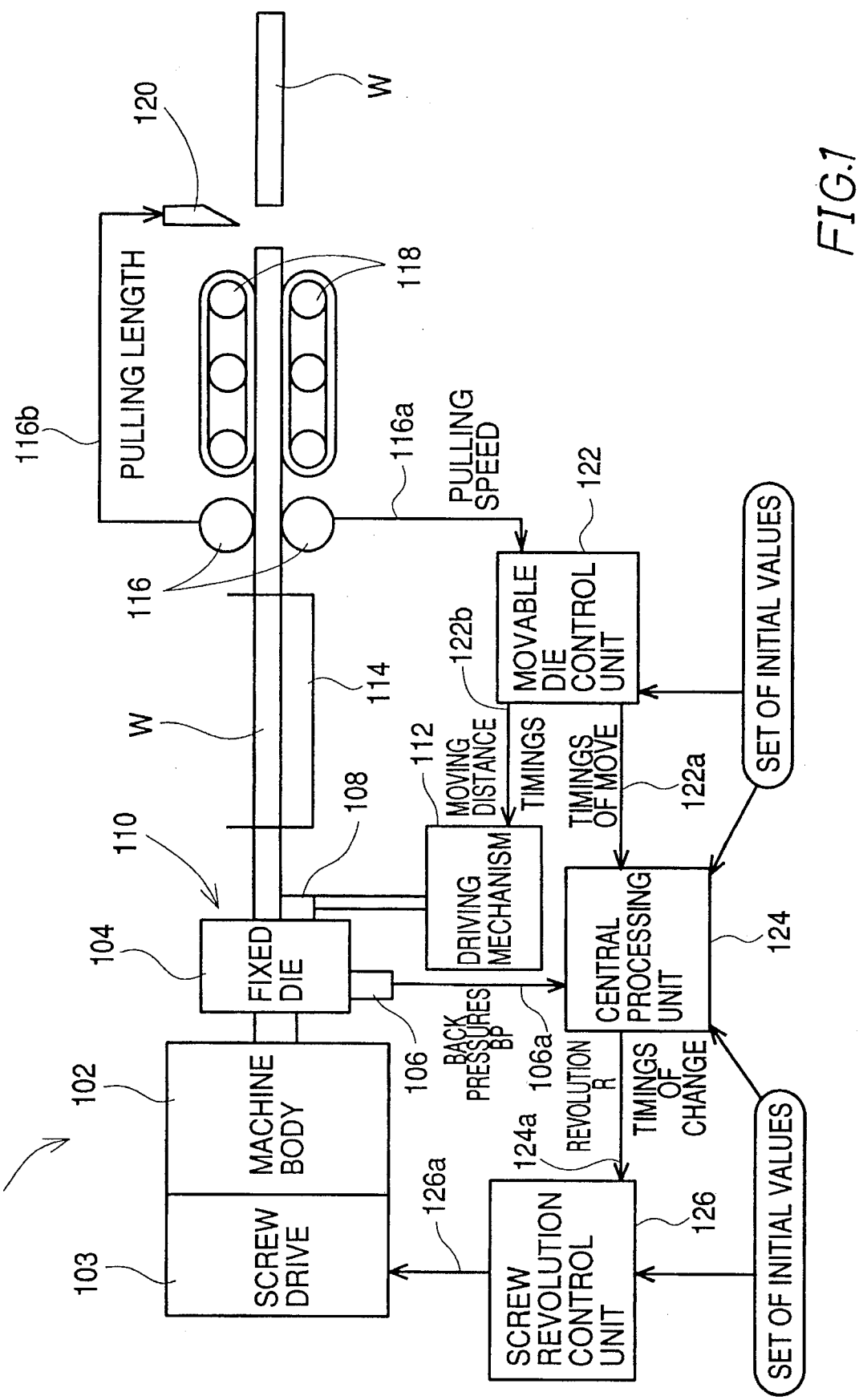
FIG. 1 is a diagram showing a construction of an extrusion molding machine used for a first embodiment of an extrusion molding method according to the present invention.

As shown in FIG. 1, the extrusion molding machine 101 is mainly constituted of a machine body 102 incorporating an extrusion screw, and a fixed die 104 located ahead thereof. A screw drive 103 is positioned on the rear portion of the machine body 102 and includes a motor, a torque transmission mechanism and the like. The screw drive 103 rotates the extrusion screw (not shown) incorporated in the machine body 102, thereby extruding a molding material filled in the machine body 102 while kneading.

On the other hand, the fixed die 104 has an opening 110 through which the molding material is extruded to be shaped to a desired cross-sectional configuration. Further, the fixed die 104 is provided with a movable die 108 to change the configuration and the area of the opening 110, and a driving mechanism 112 to move the movable die 108.

Although not illustrated in detail in FIG. 1, the movable die 108 is constituted of two movable die halves which are movable in directions crossing at right angles relative to each other. The detailed construction thereof is identical witch that described in Japanese Laid-Open Patent Publication No. 4-356216 as described above.

A cooling bath 114 is located ahead of the opening 110. The cooling bath 114 is a device to pass therethrough a molded product W as extruded, thereby cooling and setting the molded product W which has been heated by kneading and like operations during extrusion procedure.

Furthermore, pulling means 118 are located downstream of the cooling bath 114. The pulling means 118 are constituted of two pairs of rolling-up belts oppositely positioned relative to each other and plurality of rollers for driving each of the rolling-up belts.

Here, the molded product W as extruded tends to expand over the dimension; of the die (die swelling) when ejected from the die opening 110 and released from pressures applied thereto. However, the pulling means 118 may apply pulling force to the molded product to compensate the dimension thereof, thereby maintaining the dimension of the molded product to a desired cross-sectional dimension. Thus, the final cross-sectional configuration and the dimension of the extrusion molded article W are determined depending on the pulling force applied to the molded product W by the pulling means 118, back pressures applied to the molding material at the time when the molding material is extruded from the die opening 110, the extrusion speed and the dimension of the die opening 110.

The pulling force or the pulling speed of the pulling means 118 may be changed. In this embodiment, however, the pulling force and the pulling speed of the pulling means 118 are kept constant. The dimensional precision of the article W is controlled by controlling positions of the movable die 108, revolutions of the extrusion screw driven by the screw drive 103 and the like. However, depending on the configuration of the molded article or the type of the molding material, any control is carried out to change the pulling speed for each section of the molded article or for the type of the molded article.

A pair of encoders 116 are positioned upstream of the pulling means 118. The encoder is a device to continuously monitor the pulling speed of the molded product W on the basis of revolutions of a rotor which is arranged to contact the side surface of the molded product W.

Further, in the extrusion molding machine 101, since the molded product W is extruded so that the cross-sectional dimension thereof is changed in a direction perpendicular to the face of FIG. 1 but that the width thereof is not changed in an up and down direction of FIG. 1, the distance between the encoders 116 and the pulling means 118 may be maintained constant.

Figure 10:
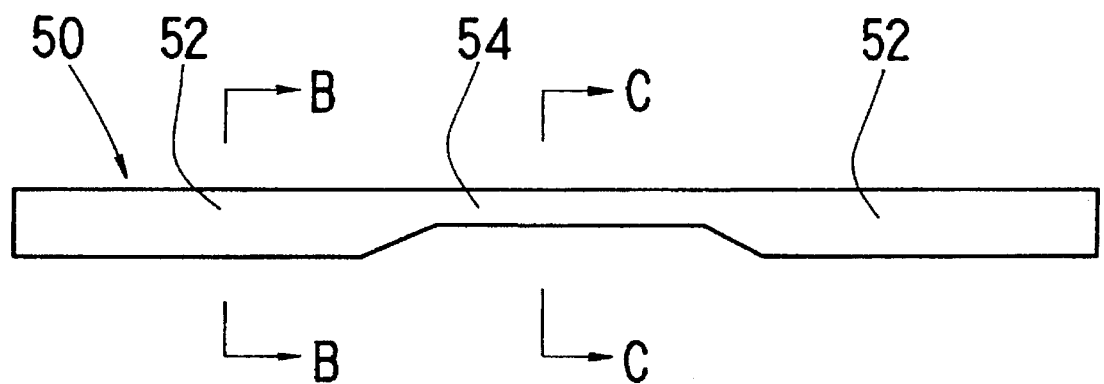
FIG. 10 is a view showing changes of the cross-sectional configuration of the weather strip.
Figure 11:
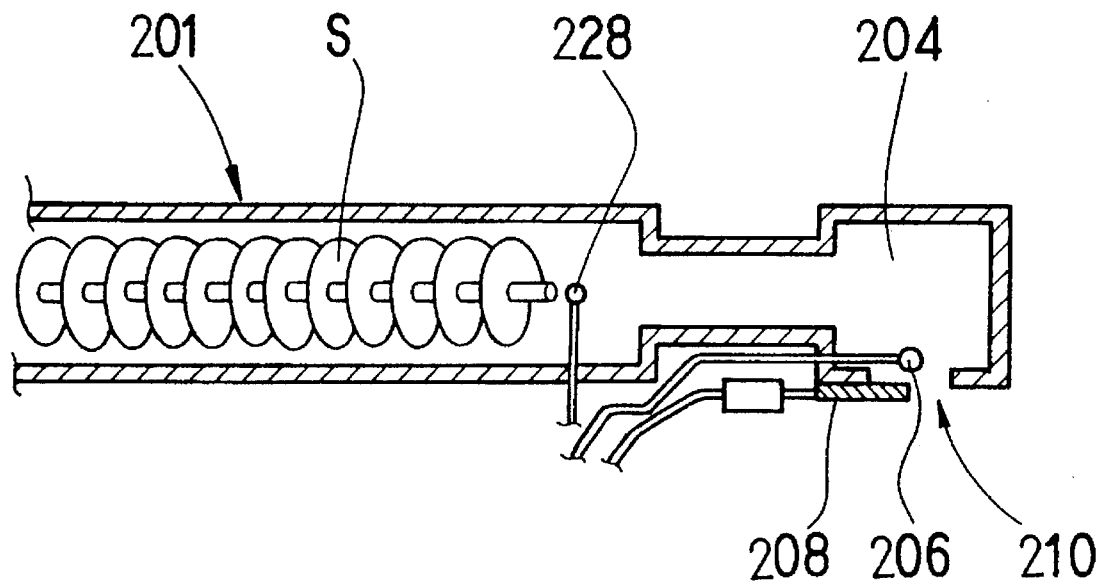
FIG. 11 is a sectional view showing an inner structure of the extrusion molding machine.

Moreover, a cutter 120 is located downstream of the pulling means 118. The cutter 120 severs the molded product W on the basis of a signal representative of a pulling length of the molded product W from said encoder 116, thereby forming a weather strip article 50 having a desired length as shown in FIG. 10.

As previously described, in this embodiment, the pulling speed is kept constant. Therefore, the molding product may be severed into the fixed length on the basis of only the signal representative of the pulling length from the encoder 116 merely by setting a timing of severing at the starting time of severing operation of the cutter 120. However, if any control is carried out to change the pulling speed, the timing of severing of the cutter 120 has to be harmonized with a move timing of the movable die 108.

Now, construction of a control system of the extrusion molding machine 101 having mechanical components thus constructed will be described with reference to FIG. 1.

A back pressure sensor 106 is mounted in the fixed die 104 of the extrusion molding machine 101 at an innermost position away from the movable die 108. The back pressure sensor 106 is a pressure sensor to detect pressures (back pressures) applied to the molding material within the fixed die 104.

An output signal lead 106a is extended from the back pressure sensor 106 and is connected to a central processing unit (arithmetical unit) 124. A control signal lead 124a is extended from the central processing unit 124 and is connected to a screw revolution control unit 126. Furthermore, an electric power lead 126a is extended from the screw revolution control unit 126 and is connected to the screw drive 103.

In addition, two output signal leads 116a and 116b are extended from said encoder 116 and are connected to a movable die control unit 122 and a driving mechanism (not shown) of said cutter 120, respectively.

The movable die control unit 122, the central processing unit 124 and the screw revolution control unit 126 are a computer system which is mainly constituted of CPU (central processing unit) and memories including RAM and ROM. These CPU RAM, ROM and the like are connected one another through data buses so as to transmit data thereamong.

Moreover, these CPU, RAM, ROM and the like are connected at an input and output interface to the output signal lead 116a and the like introduced thereinto and to control signal leads 122a and 122b and the like outwardly extending therefrom.

These two control signal leads 122a and 122b extended from the movable die control unit 122 are connected to the central processing unit 124 and the movable die driving mechanism 112, respectively.

Now, the practical control method of extrusion molding in this embodiment will be described with reference to FIGS. 1 and 2.

Figure 2:
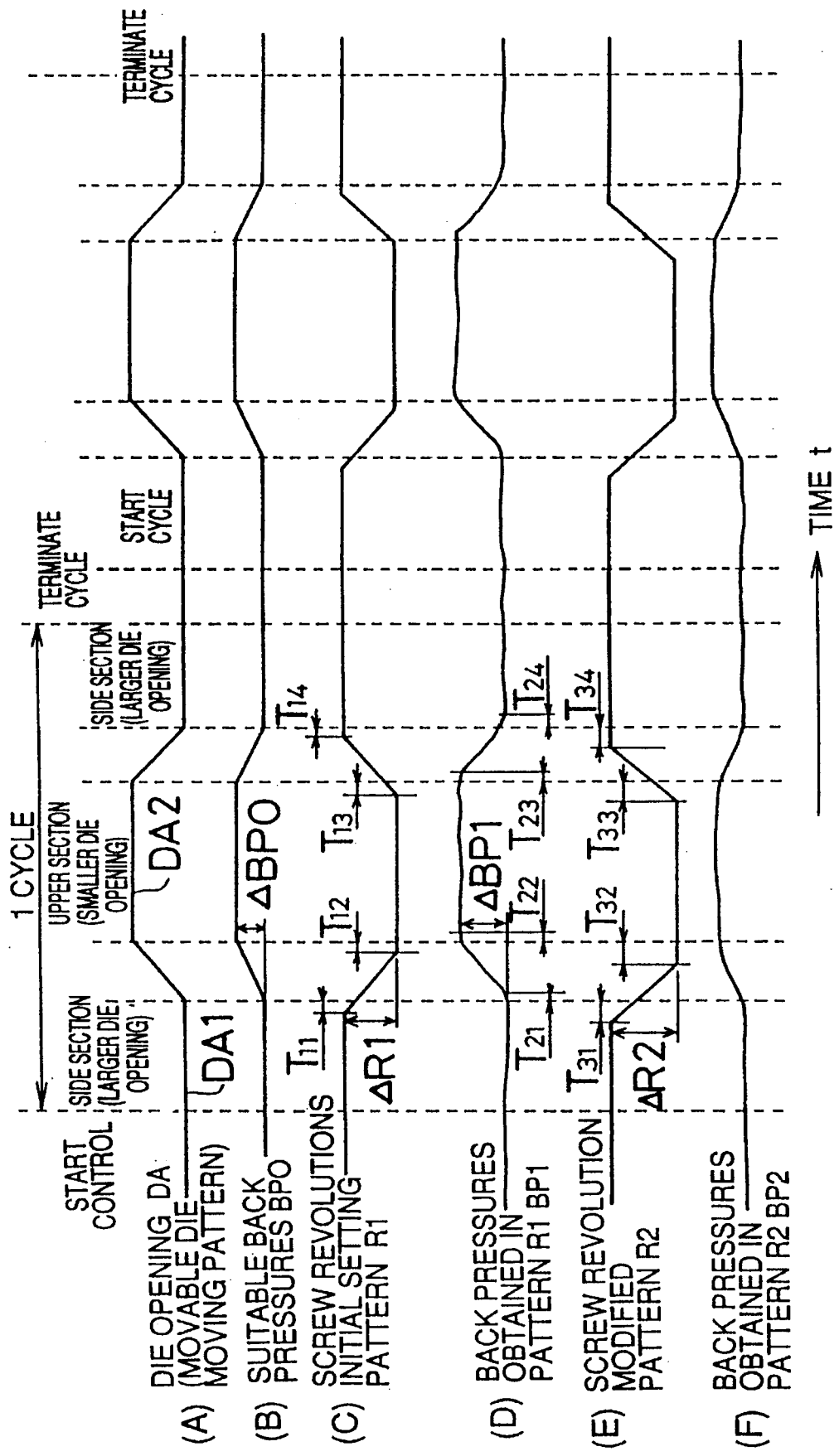
FIG. 2 is a diagram illustrating proceeding of control in the first embodiment of the extrusion molding method.

In the extrusion molding method of this embodiment, first, a moving pattern DA of the movable die 108 of the extrusion molding machine 101 is determined as shown in FIG. 2 at (A) based on the configuration of the weather strip article 50 illustrated in FIG. 10.

Subsequently, a preliminary extruding operation is carried out for each section of the molded article having a different cross-sectional configuration to determine an optimum value of the screw revolutions, i.e., to determine a specified value of the screw revolutions which may obtain the extrusion molded article having a desired cross-sectional dimension. First, the movable die 108 is secured to a position at which the opening conforms to a configuration (DA1 in FIG. 2 at (A)) corresponding to the side section 52 illustrated in FIGS. 9(A), 9(B), 9(C) and 10. Thereafter, the extrusion screw is rotated by the screw drive 103 so that the screw revolutions are changed while successively extruding the molding material. The molded product as extruded is pulled at a predetermined pulling speed by the pulling means 118.

At this moment, the screw revolutions R and values of the back pressures BP detected by the back pressure sensor 106 are stored in the RAM of the central processing unit 124. Thereafter, determined as a suitable back pressure BPO for the side section 52 is a specified value of the back pressures BP at which the cross-sectional dimension of the molded product corresponds to a desired cross-sectional dimension of the side section 52.

Subsequently, the movable die 108 is moved to a position at which the opening conforms to a configuration (DA2 in FIG. 2 at (A)) corresponding to the upper section 54. Similarly, the back pressures BP and the configuration of the extrusion molded article are determined under the condition that the extruding is successively carried out, so as to determine a suitable back pressure for the upper section 54.

Thus, as shown in FIG. 2 at (B), a pattern of the suitable back pressures BPO for the weather strip article 50 is determined. The pattern of the BPO is used as a standard basis for obtaining a preferable extrusion molded article.

Further, in this embodiment, although the suitable back pressures are only determined for two sections of the side section and the upper section, a suitable back pressure for a juncture of these sections may be determined for more precise control purposes.

In addition, based on the results of the preliminary extruding operation, an initial setting pattern R1 for the screw revolutions is determined. This initial setting pattern R1 is a pattern obtained by combining the values of the screw revolutions R which produce the suitable back pressures BPO for the respective sections.

Figure 12A:
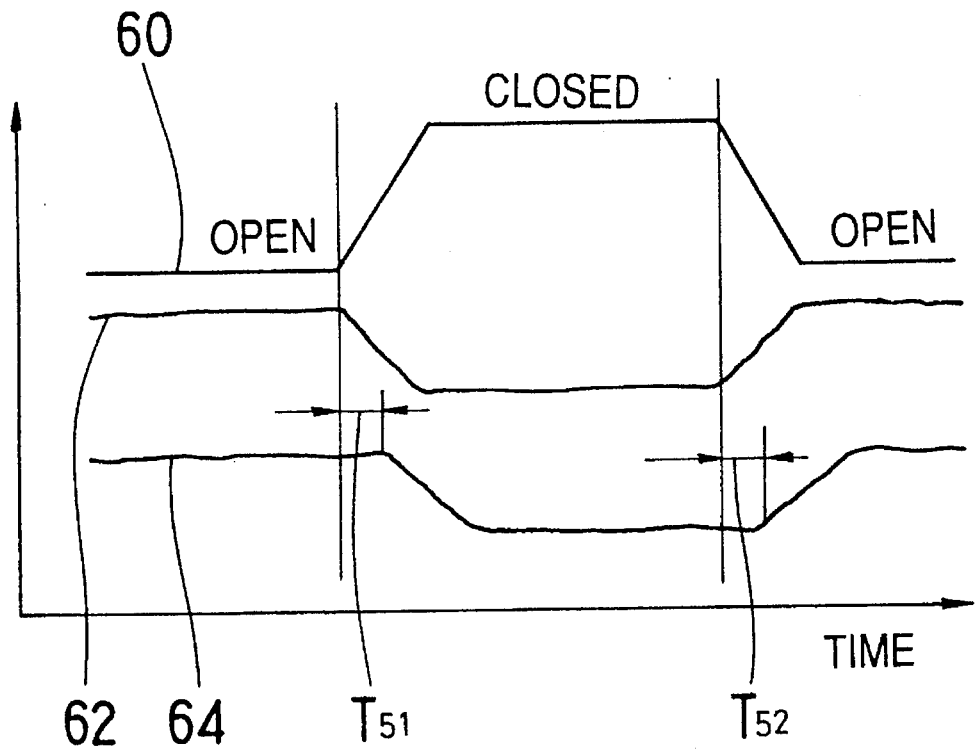
FIG. 12(A) and FIG. 12(B) are diagrams illustrating a propagation of pressure changes in a conventional extrusion molding method.
Figure 12B:
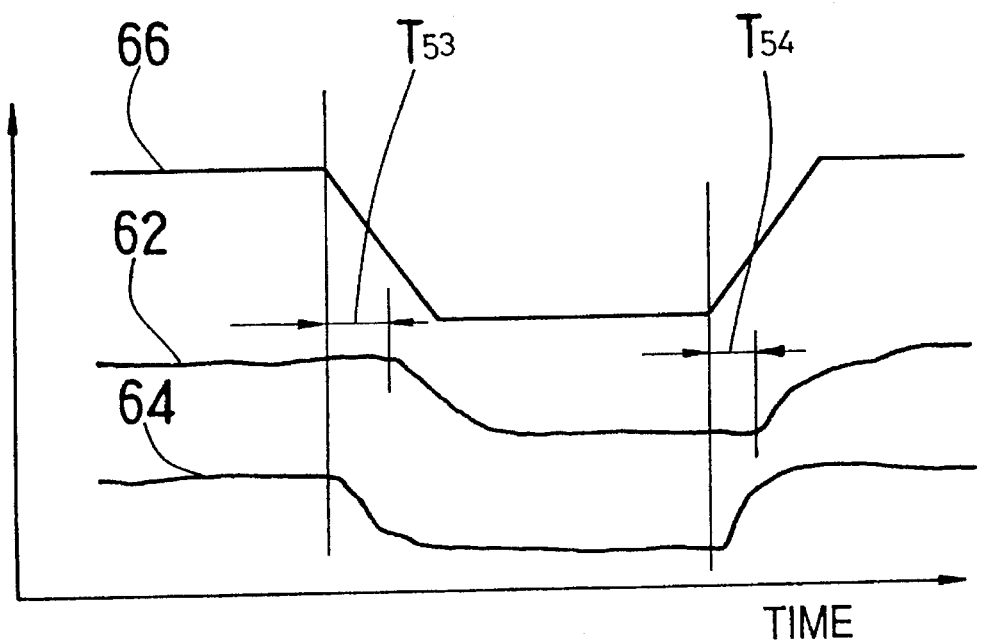
Figure 13:
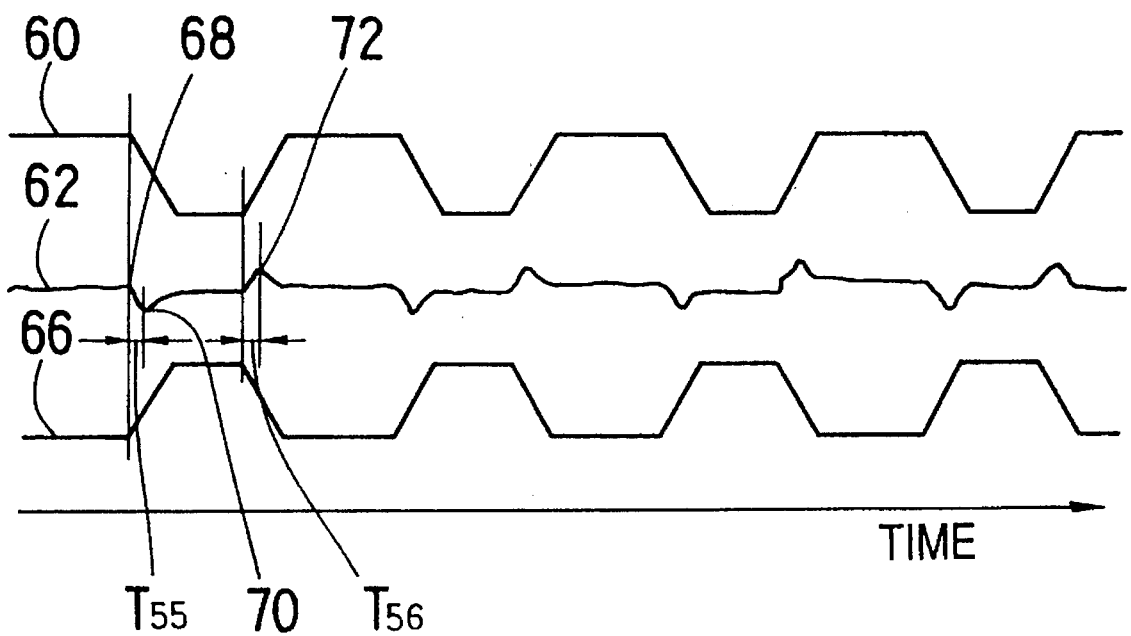
FIG. 13 is a diagram illustrating variations in back pressures in a conventional extrusion molding method.
Figure 12A:
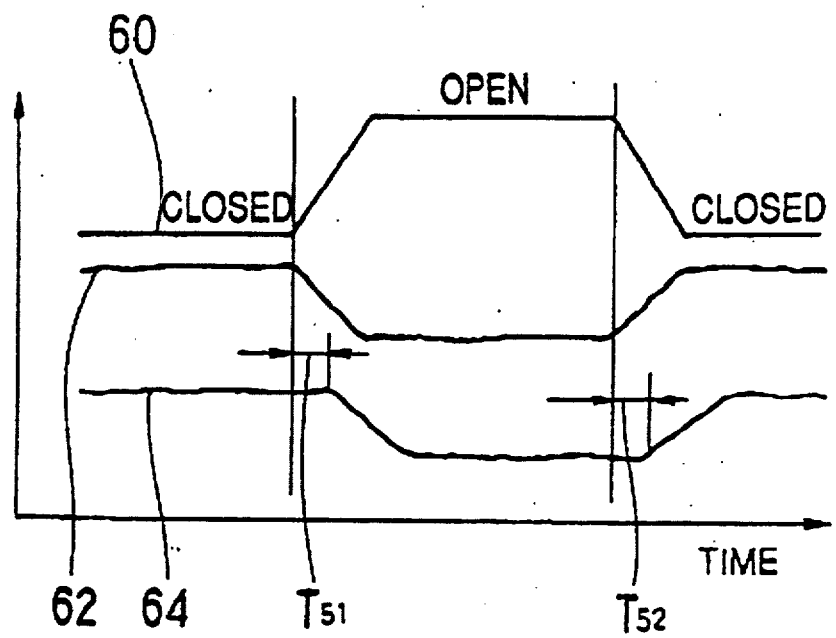

However, in consideration of the time delays as in the previous description for FIG. 12(B), as shown in FIG. 2 at (C), timings of change in the initial setting pattern R1 are advanced for periods of times $T_{11}$, $T_{12}$, $T_{13}$ and $T_{14}$ from the timings of change in the moving pattern DA of the movable die in FIG. 2 at (A).

Now, several cycles of extruding operation are carried out by the extrusion molding machine 101 while changing the revolutions of the extrusion screw in accordance with the initial setting pattern R1 of the screw revolutions thus determined. The molded product as extruded is simultaneously pulled out by the pulling means 118 at the same speed as that in the preliminary extruding operation.

During this procedure, an actual pulling speed is detected by the encoder 116 shown in FIG. 1. This is because the pulling speed may fluctuate depending on operating conditions of the extrusion molding machine 101 even if it is set to be identical with that in the preliminary extruding operation. If the actual pulling speed is different from that in the preliminary extruding operation, the moving pattern of the movable die shown in FIG. 2 at (A) is corrected based on the actual pulling speed.

That is, if the actual pulling speed is higher than that in the preliminary extruding operation, the length for a single cycle of the moving pattern DA is diminished while maintaining the proportion of the respective sections. Conversely, if the actual pulling speed is lower than that in the preliminary extruding operation, the length for a single cycle of the moving pattern DA is extended. Thus, a control is performed to correct the timings of change of the moving pattern of the movable die and not to correct the pulling speed.

Now, in the several cycles of the extrusion molding thus carried out, the back pressures BP are continuously monitored by the back pressure sensor 106 as are practiced in the preliminary extruding operation. A variation pattern of actual back pressures thus determined is shown as BP1 in FIG. 2 at (D)

The actual back pressures BP1 as obtained coincide with the suitable back pressures BPO in FIG. 2 at (B) for the side section. However, the actual back pressures BP1 are greater than the suitable back pressures BPO in FIG. 2 at (B) for the upper section. That is, a back pressure difference ΔBP1 between the actual back pressure for the side and the actual back pressure for upper sections is greater than a suitable pressure difference ΔBPO.

Moreover, timings of change of the actual back pressures at respective sections are delayed for periods of times $T_{21}$, $T_{22}$, $T_{23}$ and $T_{24}$ from the timings of change of the moving pattern DA of the movable die. Based on the result, the initial setting pattern R1 for the screw revolutions is modified.

That is, in order to diminish the back pressure difference ΔBP1 at the upper section so that the actual back pressures correspond to the suitable back pressures BPO, as shown in FIG. 2 at (E), an amount of reduction ΔR2 of the screw revolutions at the upper section is increased above an amount of reduction ΔR1 of the screw revolutions in FIG. 2 at (C). At the same time, in order to accurately conform the timings of change of the actual back pressures to those of the suitable back pressures, the timings of change of the screw revolutions are advanced further than those in the initial setting pattern so as to be advanced for periods of times $T_{31}$, $T_{32}$, $T_{33}$ and $T_{34}$ from the timings of change in the moving pattern DA of the movable die.

Several cycles of the extrusion molding are carried out in accordance with a modified pattern R2. A pattern of variations in the back pressures BP thus obtained is shown as BP2 in FIG. 2 at (F). The pattern of the modified back pressures BP2 substantially conforms to that of the suitable back pressures BPO in FIG. 2 at (B) for the magnitude and the timings of change thereof for respective sections.

That is, it may be expected that the extruding condition obtained in the preliminary extruding operation is directly reflected in the actual extruding procedure, thereby permitting formation of a suitable extrusion molded article having the desired cross-sectional configuration.

Therefore, such a condition is supposed to be a target extrusion molding condition and the extrusion molding operation is then continued under this condition to produce the articles.

Further, after the extrusion molding procedure is started under this condition to manufacture the extrusion molded articles, the back pressures are periodically checked to modify the extrusion molding condition, in consideration that the operating condition and the like may be changed.

Now, a control process in the extrusion molding method of this embodiment will be described with reference to the flow chart of FIG. 3 and FIGS. 1 and 2. FIG. 3 is a flow chart illustrating the process for determining the extrusion molding condition in the extrusion molding method of this embodiment. A control program shown in the flow chart of FIG. 3 is carried out on the CPU and RAM of the central processing unit 124 shown in FIG. 1.

Upon initiation of the control in Step S100, an initial value of the pulling speed, the moving pattern of the movable die, the pattern of the suitable back pressures and the initial setting pattern of the screw revolutions are first supplied into the computer system (Step S102). Subsequently, a control signal is transmitted from the central processing unit shown in FIG. 1 to the screw revolution control unit to energize the screw drive 103. Whereupon the extrusion screw is rotated for starting the extrusion molding operation (Step S104).

The extrusion screw is rotated while moving the movable die along the pattern shown in FIG. 2 at (A), and the control by the central processing unit 124 is started (Step S106). First, the data of the actual pulling speed for the molded product W detected by the encoder 116 are supplied into the system (Step S108).

The actual pulling speed as detected is determined if it is substantially identical with the initial value (i.e., the pulling speed in the preliminary extruding operation) or not (Step S110). If this determination is "YES", the pattern of the variations in the back pressures BP determined by the back pressure sensor 106 (BP1 in FIG. 2 at (D)) is successively supplied (Step S112). The pattern of the variations in the back pressures is compared with the pattern of the suitable back pressures BPO previously supplied to determine if these patterns are identical with each other in the magnitude of the back pressures and the timings of change for the respective sections (Step S116).

In this determination, as indicated by the pattern of the back pressures BP2 shown in FIG. 2 at (F), where the pattern of the variations in the back pressures is identical with the pattern of the suitable back pressures in the magnitude of the back pressures and the timings of change, i.e., the target extrusion molding condition corresponding to the suitable back pressures shown in FIG. 2 at (B) is recognized to be obtained. Then, the process proceeds to Step S118. In Step S118, an additional inquiry is made as to whether other conditions have to be corrected, and if the response to that is negative, the processing is terminated (Step S122) and the extrusion molding operation is carried out under the obtained condition.

On the other hand, if the determination in Step S110 is "NO", as previously described, the moving pattern DA of the movable die shown in FIG. 2 at (A) is corrected to the actual pulling Speed (Step S114). Thereafter, the back pressures are determined in Step S112.

Further, if the determination in Step S116 is "NO", the pattern of the variations in the screw revolutions is modified so that the back pressures and the timings of change conform to the pattern of the suitable back pressures BPO (Step S120). Subsequently, the inquiry is made in Step S118 as to whether the processing should be terminated.

If it is not necessary to confirm the result of the extrusion molding procedure carried out under the modified pattern of the screw revolutions, the determination in Step S118 is "YES" sol that the processing is terminated (Step S122). If it iS necessary to modify the pattern of the variation in the screw revolutions, the determination is "NO", and Step S108 seq. are repeated.

Figure 3:
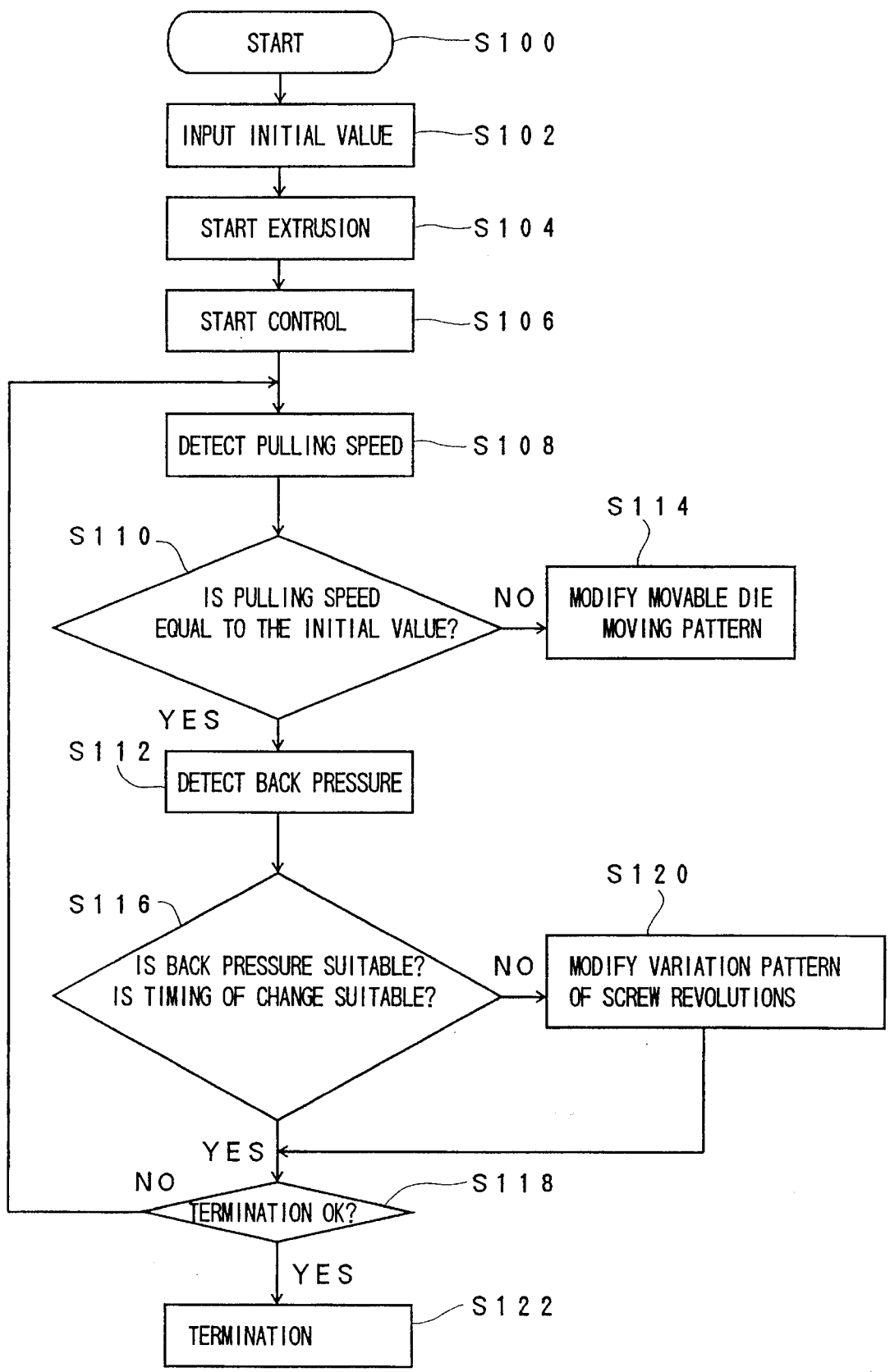
FIG. 3 is a flow chart illustrating process for determining an extrusion molding condition in the first embodiment of the extrusion molding method.

Further, after the extrusion molding procedure is started under the optimum condition determined by the procedure of FIG. 3 described above to manufacture the extrusion molded articles, the procedures according to the flow chart of FIG. 3 are periodically carried out. The reason is that the extrusion molding condition may be changed with variations in the operating condition of the extrusion molding machine 101 and the like.

<Second Embodiment>

Now, a second embodiment embodying the present invention will be explained with reference to FIGS. 4 to 6. In this embodiment, the back pressures are determined at a position close to a die opening, and an extrusion molding is carried out under conditions that suitable back pressures are constant oven the entire length of an extrusion molded product.

Figure 5:
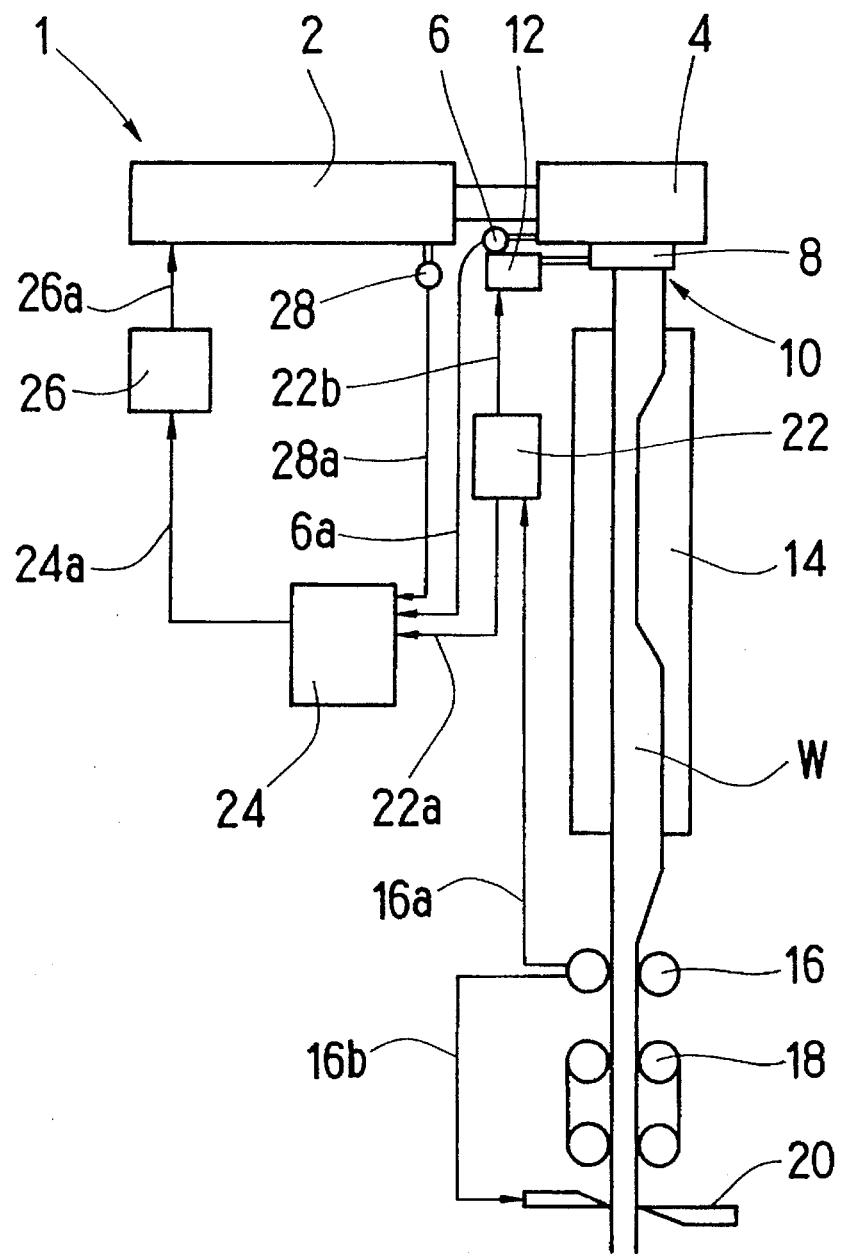
FIG. 5 is a diagram showing a construction of an extrusion molding machine used for the second embodiment and a third embodiment of the extrusion molding method.

An extrusion molding method of this embodiment is performed by an extrusion molding machine 1 shown in FIG. 5. As shown in FIG. 5, the extrusion molding machine 1 is mainly constituted of a machine body 2 incorporating an extrusion screw (not shown in FIG. 5) which extrudes a molding material while kneading, and a fixed die located downstream thereof.

The fixed die 4 includes an opening 10 having a desired configuration through which the molding material is extruded in a desired configuration. Further, the fixed die 4 is provided with a movable die 8 to change the configuration and the area of the opening 10, and a driving mechanism 12 to move the movable die 8.

A cooling bath 14 is located ahead of the opening 10. The cooling bath 14 is a device to pass therethrough the molded product W as extruded, thereby cooling and setting the molding product.

Furthermore, located downstream of the cooling bath 14 are pulling means 18 upstream of which encoders 16 are positioned. In this embodiment, unlike the first embodiment, as shown in FIG. 5, the molded product W is extruded in such a way that the cross-sectional dimension thereof is changed in a lateral direction of the spacing formed between the pulling means 18.

Therefore, each of the encoder 16 and the pulling means 18 is provided width a mechanism which may change the spacing therebetween depending upon the width of the molded product W.

In the second embodiment, similar to the first embodiment, the pulling speed of the pulling means 18 is kept constant. The dimension of the article W is controlled by controlling positions of the movable die 8, revolutions of the extrusion screw within the machine body 2 and the like.

Moreover, a cutter 20 is located ahead of the pulling means 18. The cutter 20 severs the molded product W on the basis of a signal from the encoder 16, thereby forming a weather strip article 50 having a desired length.

Now, construction of a control system of the extrusion molding machine 1 having mechanical components thus constructted will be described with reference to FIG. 5.

A head pressure sensor 28 is located ahead of an extrusion screw (not shown) received in the machine body 2. The head pressure sensor 28 is a sensor to detect head pressures, i.e., pressures in a region in front of the screw in the machine body 2.

On the others hand, a back pressure sensor 6 is received in the fixed die 4. Unlike the first embodiment, the back pressure sensor 6 is located adjacent to the opening 10. The back pressure sensor 6 detects the back pressures in the vicinity of the opening 10.

Output signal leads 6a and 28a are extended from these pressure sensors 6 and 28, respectively, and are connected to a screw revolution control unit 24. A control signal lead 24a is extended from the screw revolution control unit 24 and is connected to a machine operation unit 26. Furthermore, an electric power lead 26a is extended from the machine operation unit 26 and is connected to a screw drive motor (not shown) in the machine body 2.

In addition, two output signal leads 16a and 16b are extended from the encoder 16 and are connected to a control unit 22 and a driving mechanism (not shown) of said cutter 20, respectively.

The control unit 22 and the screw revolution control unit 24 are a computer system which is mainly constituted of CPU (central processing unit) and memories including RAM and ROM. These CPU, RAM, ROM and the like are connected one another through data buses so as to transmit data thereamong.

Moreover, these CPU, RAM, ROM and the like are connected at an )input and output interface to the output signal lead 16a and the like introduced thereinto and to control signal leads 22a and 22b and the like outwardly extending therefrom.

These two control signal leads 22a and 22b extended from the control unit 22 are connected to the screw revolution control unit 24 and the driving mechanism 12, respectively.

Now, the practical control method of this embodiment will be described with reference to FIG. 4. In the extrusion molding method of this embodiment, the screw revolutions are controlled to keep the back pressures constant in all of the sections of the molding product.

As described previously, since the back pressure sensor 6 is positioned adjacent to the opening 10, variations in the back pressures due to changes of the area of the die opening and the screw revolutions are negligible at the region of the back pressure sensor 6. Therefore, when the suitable back pressures are determined for respective sections of the molding product having different cross-sectional configuration in a way similar to the first embodiment, such suitable back pressures are kept constant. That is, in this embodiment, the suitable back pressures show a pattern flattened over the entire length of the extrusion molded product. To obtain such a pattern, the screw revolutions SP are controlled as follows.

Figure 4:
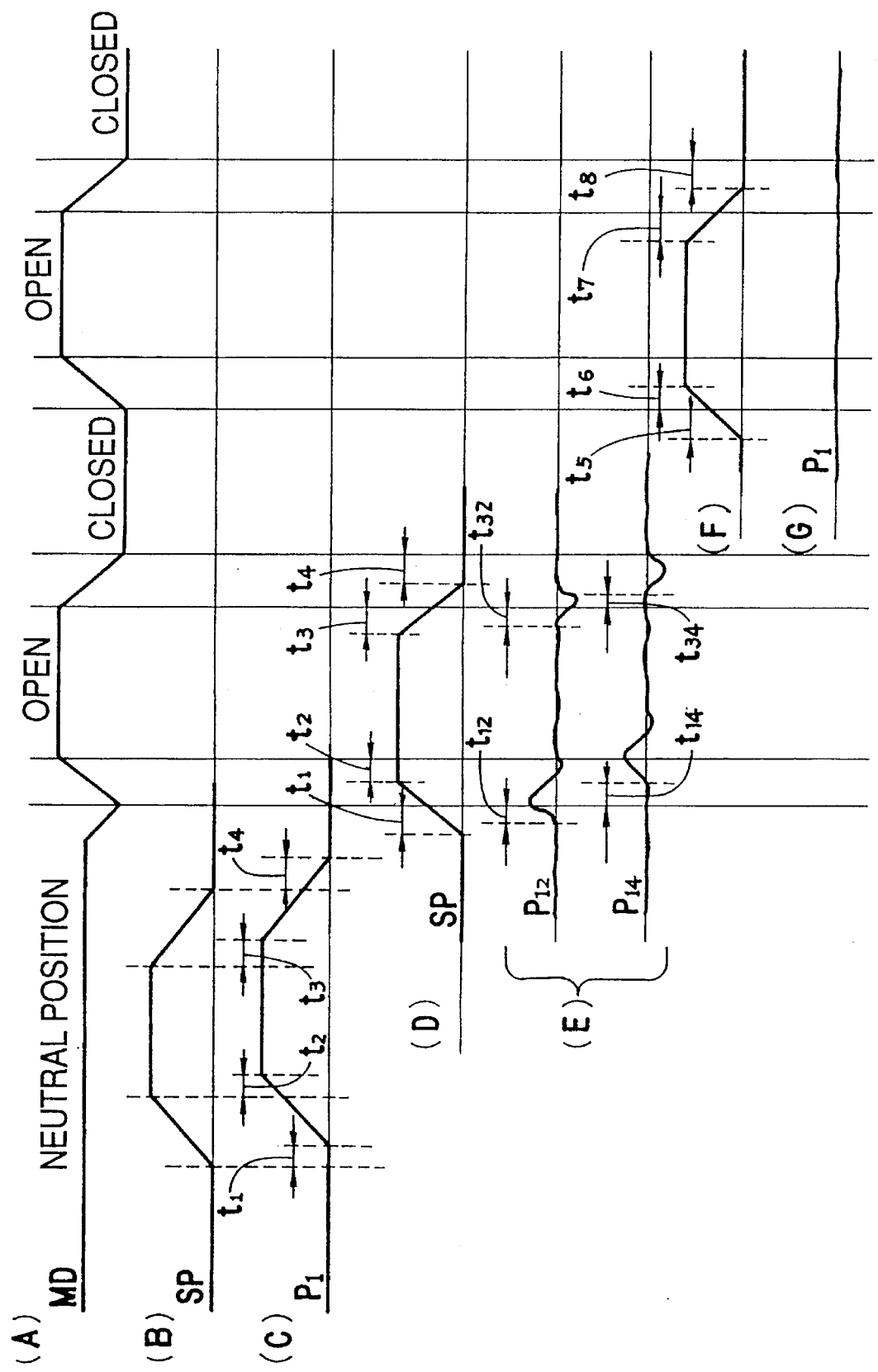
FIG. 4 is a diagram illustrating proceeding of control in a second embodiment of the extrusion molding method according to the present invention.

As shown in FIG. 4 at (A), first, the movable die 8 of the extrusion molding machine 1 is secured to a neutral position in positions MD thereof. Thereafter, a single cycle of extruding operation is carried out while changing the screw revolutions SP in accordance with a desired pattern shown in FIG. 4 at (B).

In this case, with respect to the extrusion molding machine 1, a change rate of the revolutions of the extrusion screw is previously determined to cancel the variations in the back pressures due to the changes of the area of the die opening. Based upon the change rate of the revolutions of the extrusion screw, the desired pattern of the screw revolutions SP is determined as shown in FIG. 4 at (B) is determined.

During this single cycle of extruding operation, the variations in the back pressures are detected by the back pressure sensor 6 shown in FIG. 5. The variations in the back pressures as detected are referred to as a reference $P_1$ in FIG. 4 at (C). For the reasons described above, as shown in FIG. 4 at (C), the back pressures $P_1$ are changed with time delays $t_1$, $t_2$, $t_3$, and $t_4$ after the screw revolutions SP are changed. These time delays $t_1$–$t_4$ are stored in the RAM of the control unit 22.

Thereafter, as shown in FIG. 4 at (A), a second cycle of extrusion molding is carried out while moving the movable die to change the area of the die opening and changing the screw revolutions SP in accordance with a desired pattern.

In this operation, as shown in FIG. 4 at (D), a control is performed so that timings of change of the screw revolutions SP are advanced for periods of the time delays $t_1$–$t_4$. Simultaneously, the variations in the back pressures $P_1$ are detected.

As shown in FIG. 4 at (E), if the variations in the back pressures due to deviations of the timings of changes of the screw revolutions are still observed, the timings of change of the screw revolutions SP are further controlled to compensate the deviations. That is, as back pressures $P_{12}$ in FIG. 4 at (E), if the timings of change of the screw revolutions SP are too fast, a control is performed to delay the timings of change of the screw revolutions for periods of excessive times $t_{12}$ and $t_{32}$. By contrast, as back pressures $P_{14}$ in FIG. 4 at (E), if the timings of change of the screw revolutions are still late, a control is performed to advance the timings of change of the screw revolutions for periods of delayed times $t_{14}$ and $t_{34}$.

Thereafter, as shown in FIG. 4 at (F), an extrusion molding is again carried out while changing the screw revolutions SP in accordance with the timings of change as corrected and changing the positions MD of the movable die as shown in FIG. 4 at (A).

The control of the timings of change of the screw revolutions shown in FIG. 4 at (F) is carried out by using equations, $t_5=t_1-t_{12}$ and $t_7=t_3-t_{32}$ (in the case, "too fast") or $t_5=t_1+t_{14}$ and $t_7=t_3+t_{34}$ (in the case, "too late").

According to such a control, the screw revolutions SP are increased or decreased in such a manner that the timings of change of the screw revolutions SP are advanced for periods of actual time delays from changing of the back pressures $P_1$ thereby eliminating the variations in the back pressures $P_1$ due to the deviations of the timings of changes of the screw revolutions, as shown in FIG. 4 at (G). As a result, the back pressures $P_1$ are surely maintained constant.

Further, FIG. 4 shows an example in which the variations in the back pressures $P_1$ can be canceled in a first correcting attempt of the timings of change of the screw revolutions SP. However, if the variations in the back pressures due to the deviations of the timings of changes of the screw revolutions are still observed even after the first attempt, additional correcting attempts are carried out to correct the timings of change of the screw revolutions SP.

Thus, the variations in the back pressures $P_1$ are surely prevented, whereupon the uniform extrusion molded article can be obtained without wasting the molding material.

Now, a control process in the extrusion molding method of this embodiment will be described with reference to the flow chart of FIG. 6 and FIGS. 4 and 5. FIG. 6 is a flow chart illustrating the process for controlling the variations in the back pressures at the die opening in the extrusion molding method of this embodiment. A control program shown in the flow chart of FIG. 6 is repeatedly carried out at short time intervals on the CPU and RAM of the control unit 22 shown in FIG. 5.

Upon initiation of the control in Step S10, an inquiry is first made as to whether there are the data with respect to the optimum timings of change of the screw revolutions for each section of the molded product having a different cross-sectional configuration (Step S12). If such data are stored in the memories (the RAM or ROM) of the control unit 22, i.e., if the response to the inquiry in Step S12 is "YES", then, the process proceeds to Step S14 so that such data are read (into the RAM of the control unit 22. Thereafter, an additional process is made in Step S22.

Alternatively, if the data are not stored in the memories, i.e., if the response to the inquiry in Step S12 is "NO", then, the process proceeds to Step S16 so that additional processes are made for processing data of the optimum timings of control of the screw revolutions.

These processes include steps of securing the movable die to the neutral position (Step S16), carrying out the single cycle of extruding operation while changing the screw revolutions (Step S18), and detecting the time delays between the changes of the back pressures and the timings of change of the screw revolutions (Step S20). Thus, the values of the time delays $t_1$–$t_4$ shown in FIG. 4 at (C) are determined.

Subsequently, the process proceeds to Step S22. In Step S22, as shown in FIG. 4 at (D), a control is performed based on the data read on in Step S14 or the data of the time delays determined in Steps S16–S20 so that the timings of change of the screw revolutions are advanced for periods of the time delays $t_1$–$t_4$. Thereafter, in Step S24 and later, based upon the timings of change of the screw revolutions as modified, the extrusion molding is carried out while moving the movable die.

Specifically, after a control starting signal for the movable die is transmitted from the control unit 22 to the driving mechanism 12 in Step S26, the extruding operation is carried out while moving the movable die 8 in accordance with a desired program, i.e., the pattern shown in FIG. 4 at (A) (Step S28).

At the moment, as shown in FIG. 4 at (E), the back pressures $P_1$ are detected by the back pressure sensor 6 so as to check the variations therein (Step S30). In the presence of the variations in the back pressures as shown in FIG. 4 at (E), the determination in Step S32 is "NO", whereupon the timings of change of the screw revolutions are modified again in Step S34.

Thereafter, as shown in FIG. 4 at (F), an extrusion molding is again carried out while changing the screw revolutions SP in accordance with the timings of change as modified (Steps S26 to S30). If the variations in the back pressures are canceled out during this procedure, as shown in FIG. 4 at (G), the determination in Step S32 is "YES", and then, the profess proceeds to Step S36.

If a signal for terminating the extrusion molding has been transmitted to the machine operation unit 26 of the extrusion molding machine 1, the determination in Step S36 is "YES", so that the extrusion molding is terminated (Step S38). If the signal for terminating the extrusion molding has not been transmitted, then, the process returns to Step S26 so that the back pressures are controlled again.

As indicated above, even if the variations in the back pressures $P_1$ are once canceled out, as shown in FIG. 4 at (G), the procedures in Steps S26 to S34 are periodically carried out. The reason is that the back pressures may change with variations in factors in the extrusion molding machine 1.

<Third Embodiment>

Now, a third embodiment will be explained with reference to FIGS. 7 and 8. As with the second embodiment, an extrusion molding method of this embodiment is also performed by the extrusion molding machine 1 shown in FIG. 5. Moreover, in this embodiment, the screw revolutions are controlled so that the back pressures detected at the position close to the die opening are constant over the entire length of the extrusion molded product.

Now, the practical control method in this embodiment will be described with reference to FIG. 7. As shown in FIG. 7 at (A), in this extrusion molding method, the movable die 8 is set to a neutral position in the positions MD thereof, and a single cycle of extrusion molding is carried out while changing the screw revolutions SP in accordance with a desired pattern shown in FIG. 7 at (B).

Figure 7:
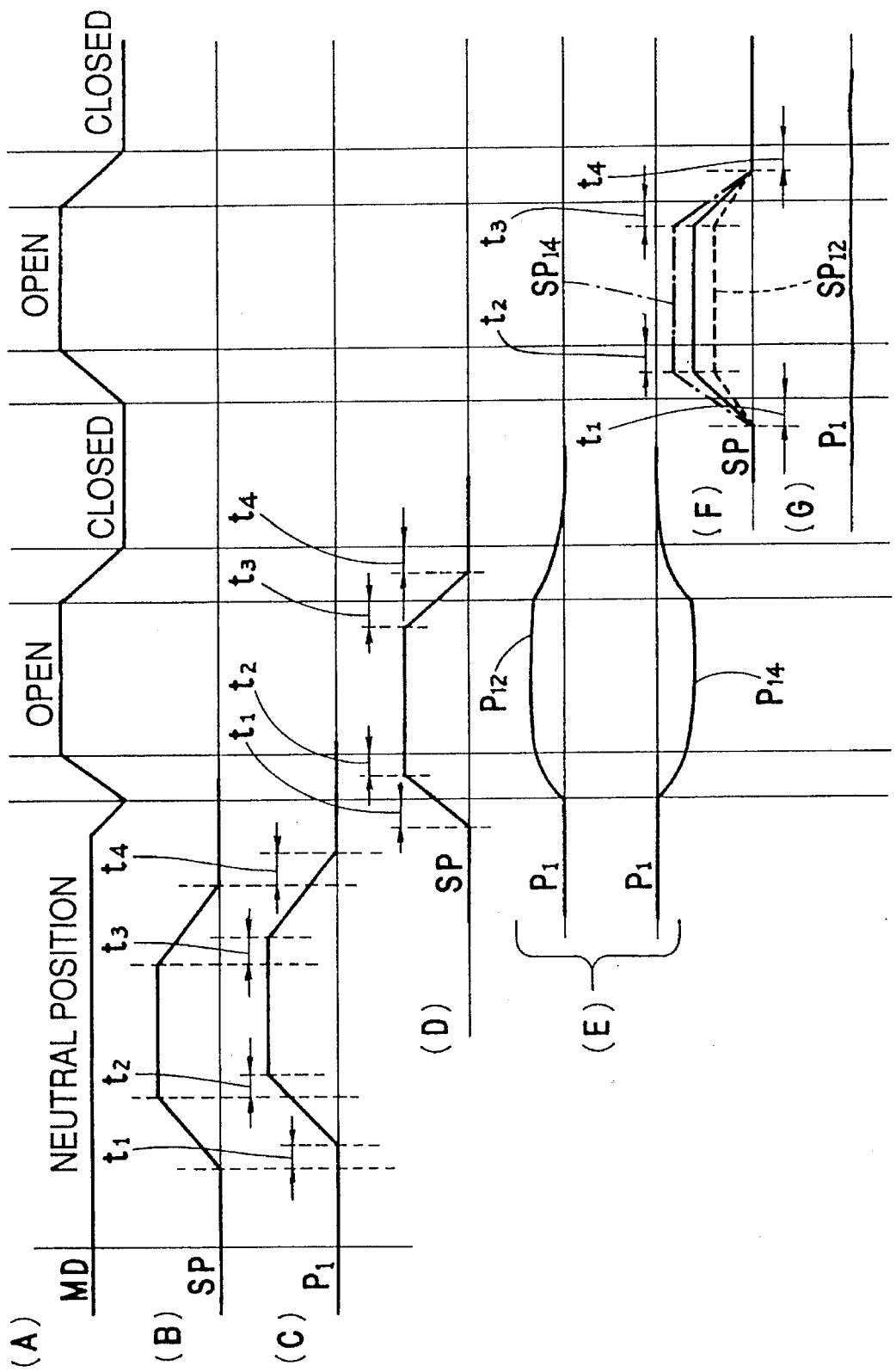
FIG. 7 is a diagram illustrating proceeding of control in the third embodiment of the extrusion molding method.

After that, the same operations as the second embodiment are continued to a second cycle of extruding operation shown in FIG. 7 at (C) in which a control is performed so that the timings of change of the screw revolutions SP are advanced for periods of the time delays $t_1$–$t_4$.

In this embodiment, upon such a control, the timings of change of the screw revolution SP are adequate to cancel the variations in the back pressures, as shown in FIG. 7 at (E). However, as referred to as $P_{12}$ and $P_{14}$ in FIG. 7 at (E), some variations in the back pressures occur since amounts of the changes of the screw revolutions SP are insufficient.

The reference $P_{12}$ in FIG. 7 at (E) indicates a case that increments of the screw revolutions SP are too large, whereupon the back pressures are higher than a level of the suitable back pressures. On the other hand, the reference $P_{14}$ in FIG. 7 at (E) indicates a case that the increments of the screw revolutions SP are too small, so that the back pressures are lower than the level of the suitable back pressures.

Therefore, in this embodiment, an attempt is carried out to correct the inadequacy of the amounts of the changes of the screw revolutions SP.

That is, where the back pressures are changed as the reference $P_{12}$ in FIG. 7 at (E), as shown as $SP_{12}$ in FIG. 7 at (F), a control is performed in such a way that the amounts of the changes of the screw revolutions SP are decreased relative to the back pressures in FIG. 7 at (D). Further, since the timings of change of the screw revolutions SP are adequately controlled, the extrusion molding is performed without changing the timings of change.

Conversely, if the back pressures are changed as the reference $P_{14}$ in FIG. 7 at (E), as shown as a reference $SP_{14}$ in FIG. 7 at (F), a control is performed in such a way that the amounts of thee changes of the screw revolutions SP are increased relative to the back pressures in FIG. 7 at (D).

Thus, the amounts of the changes of the screw revolutions SP are corrected based upon the variations in the back pressures, thereby producing the stable back pressures $P_1$ having no variations, as shown in FIG. 7 at (G).

Further, FIG. 7 shows an example in which the variations in the back pressures $P_1$ can be eliminated in a first correcting attempt of the amounts of the changes of the screw revolutions SP. However, if the variations in the back pressures due to the inadequacy of the amounts of the changes of the screw revolutions are still present even after the first attempt, additional attempts are carried out to correct the changes of the screw revolutions SP.

Inherently, it is expected that a predetermined adequate amount of the change $SP_{10}$ of the screw revolutions may preclude the variations in the back pressures. In a practical extrusion molding operation, however, pressure distributions in the molding die may be changed by several factors. According to this extrusion molding method, even in such a case, the variations in the back pressures are reliably prevented.

Accordingly, this extrusion molding method may more precisely equalize the back pressures, thereby providing a more uniform molding product.

Now, a control process in the extrusion molding method of this embodiment will be described with reference to the flow chart of FIG. 8 and FIGS. 5 and 7. Like the second embodiment, a control program shown in the flow chart of FIG. 8 is also repeatedly carried out at short time intervals on the CPU and RAM of the control unit 22 shown in FIG. 5.

Figure 6A:
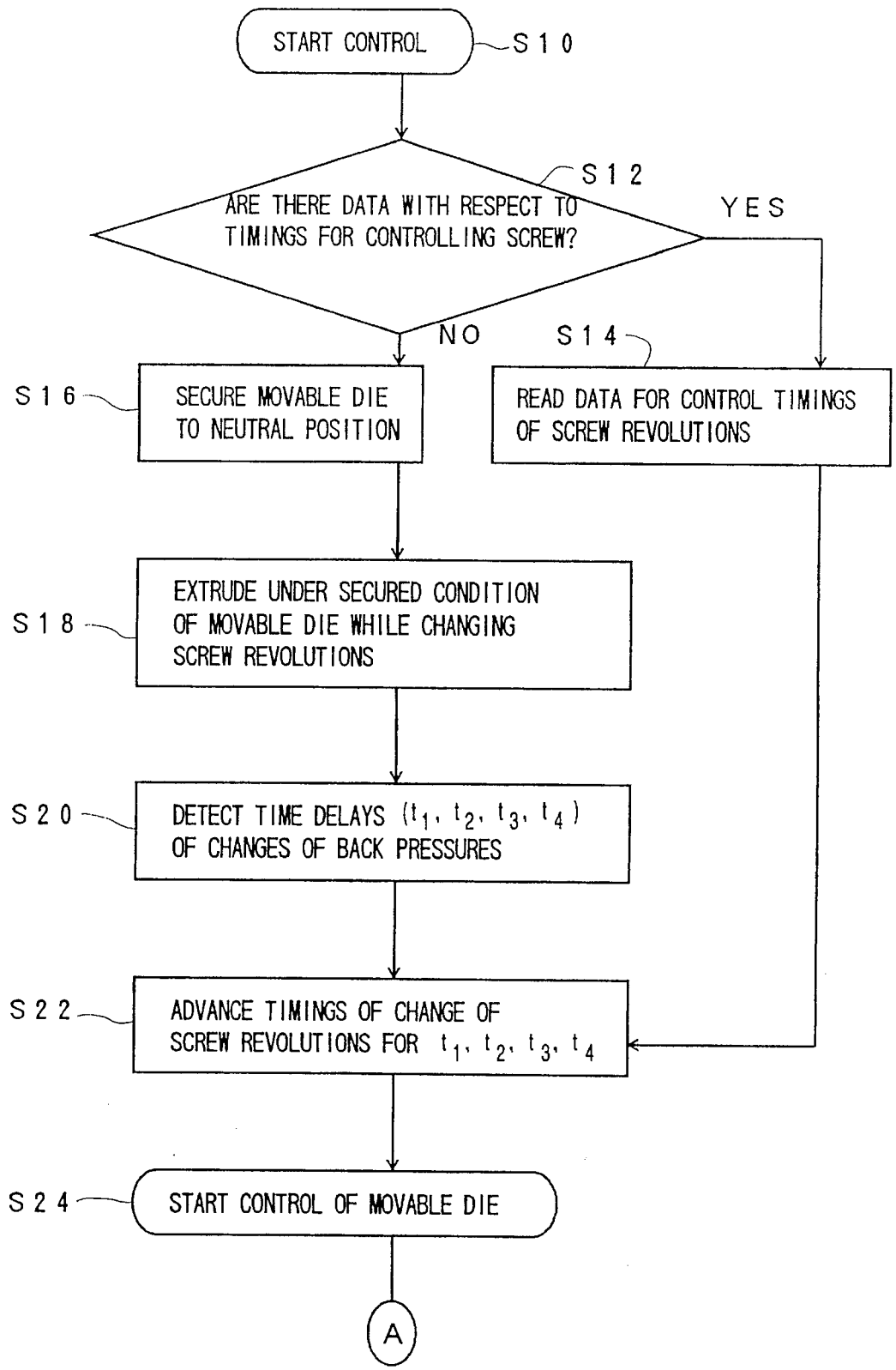
FIG. 6 is a flow chart illustrating process in the second embodiment of the extrusion molding method.
Figure 6B:
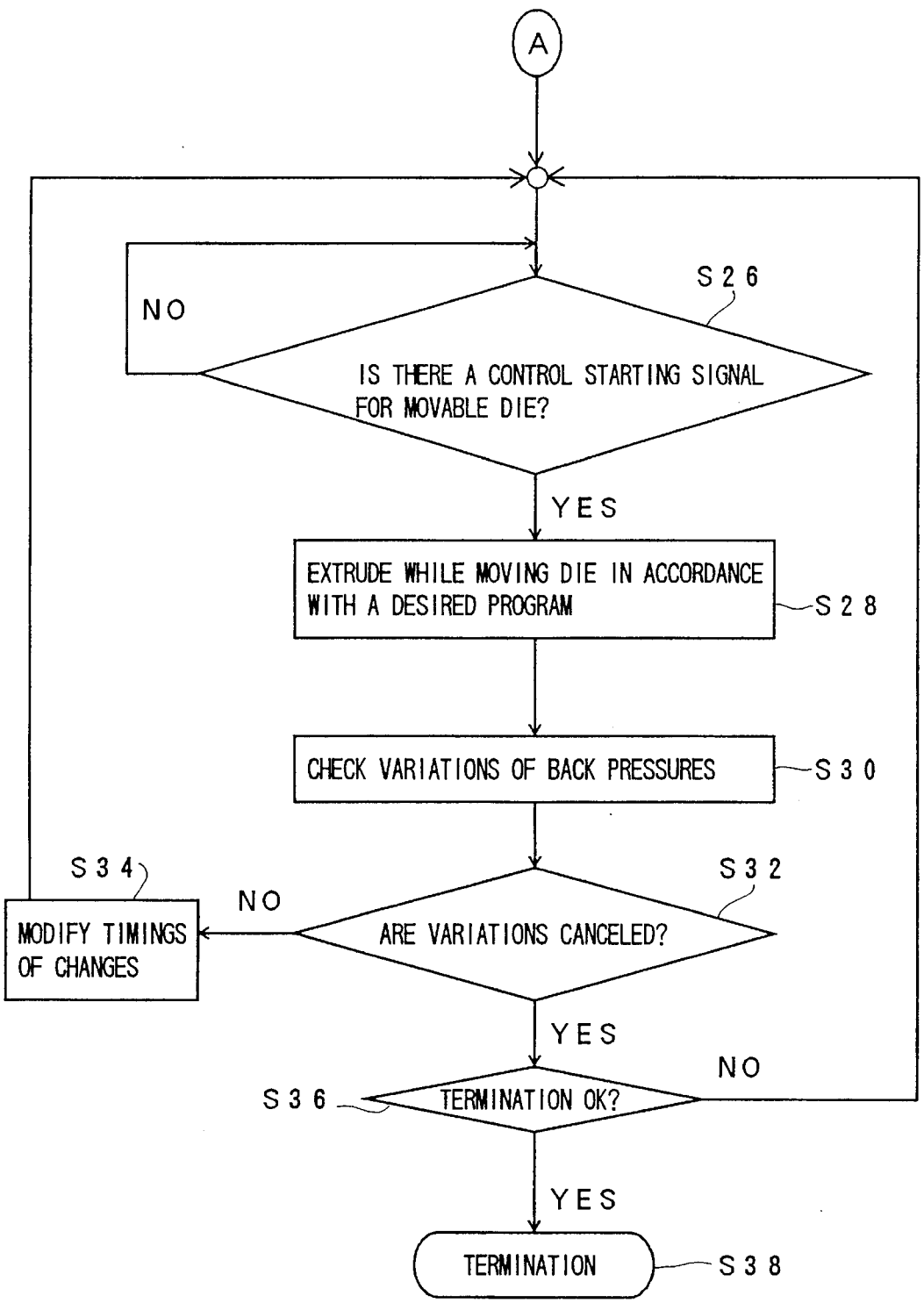
Figure 8A:
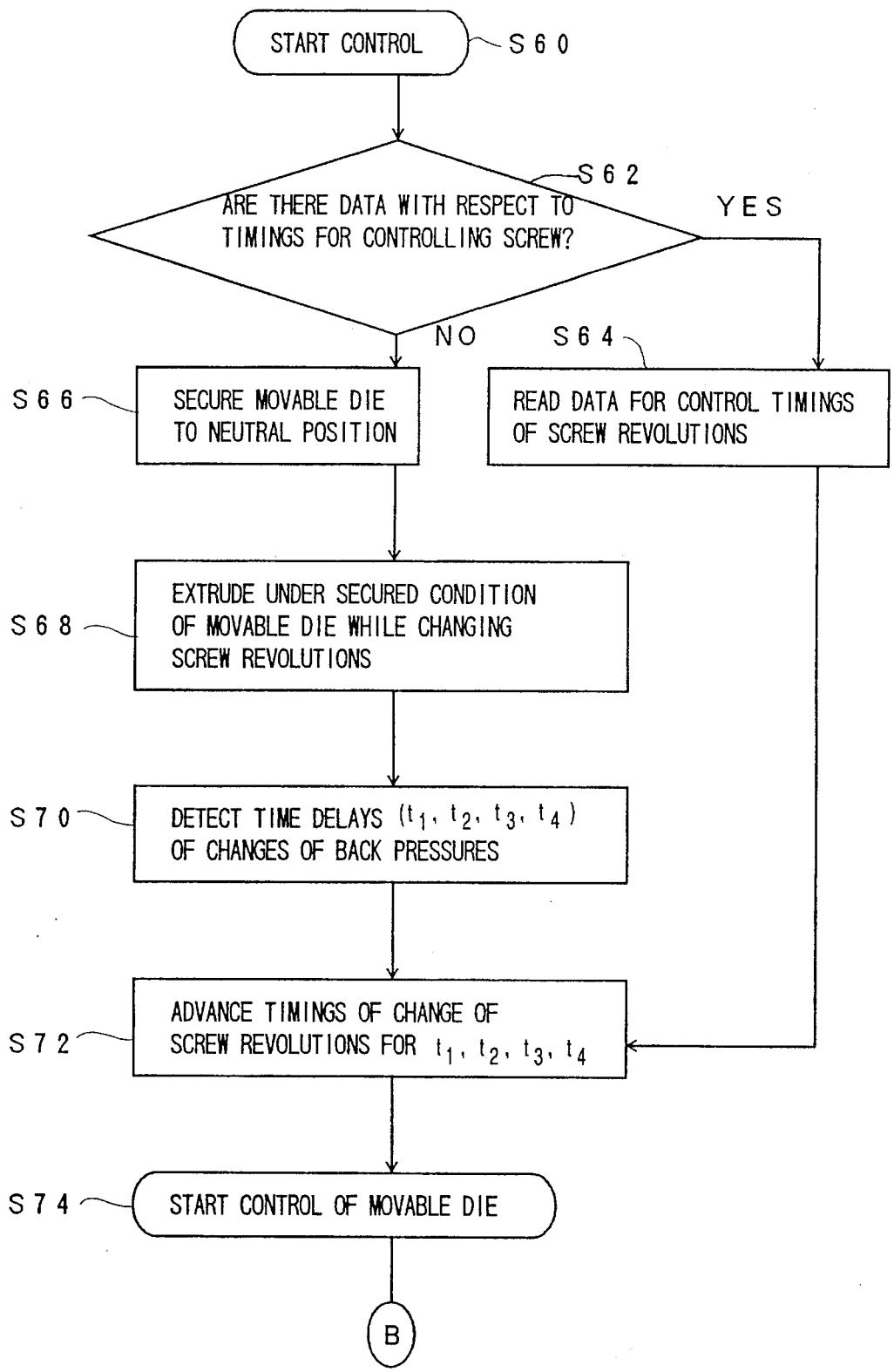
FIG. 8 is a flow chart illustrating process in the third embodiment of the extrusion molding method.
Figure 8B:
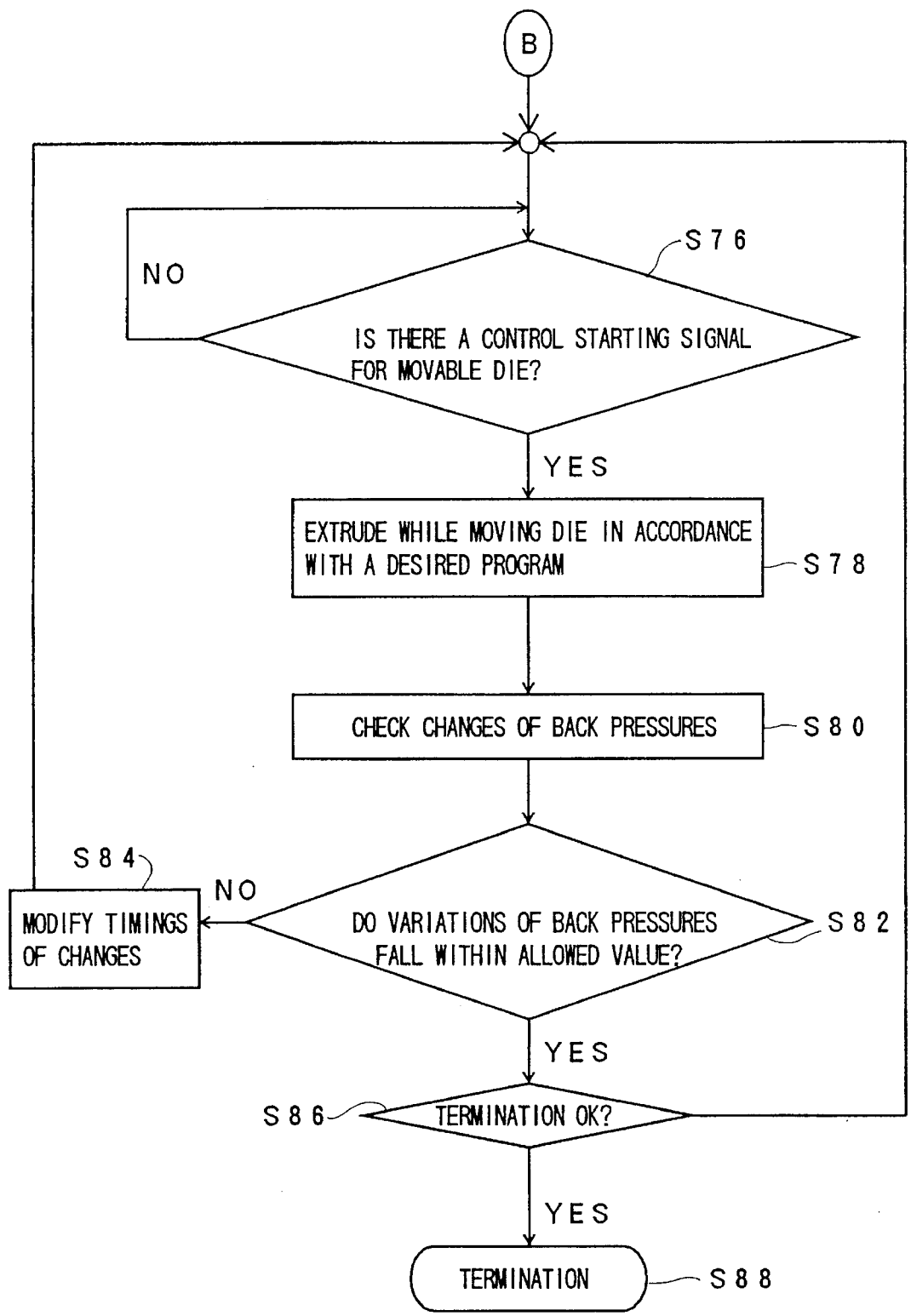
Figure 9A:
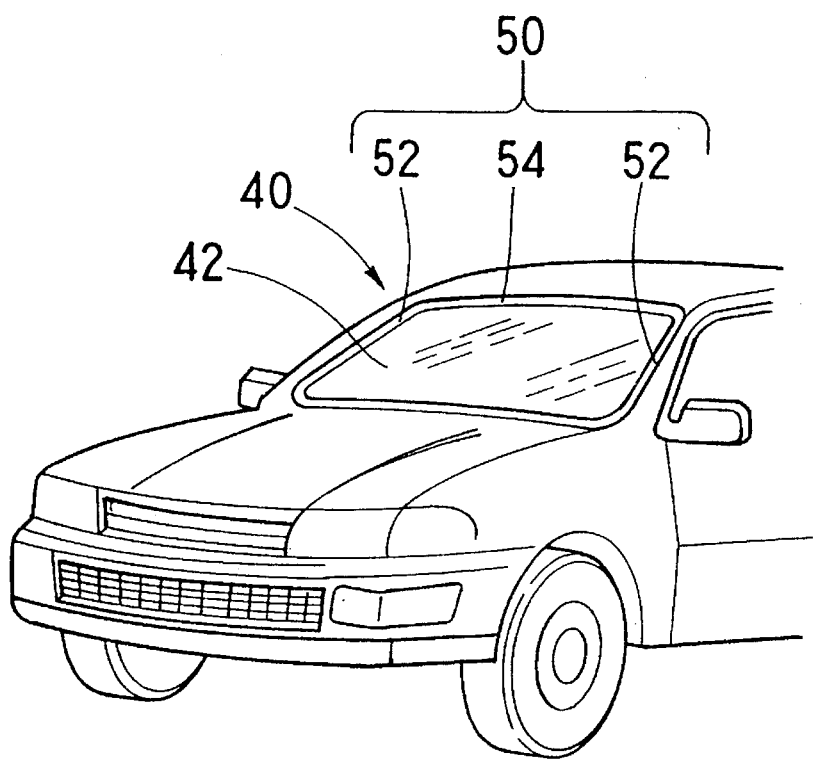
FIG. 9(A), FIG. 9(B) and FIG. 9(C) are views showing a weather strip as an exemplary molded article of which the cross-sectional configuration is longitudinary modified.
Figure 9B:
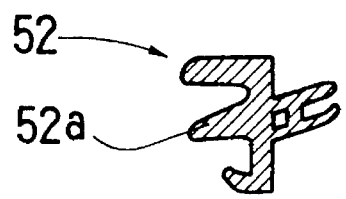
Figure 9C:
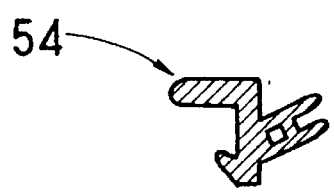

Further, since Steps S60 to S62, S64, S66, S68, S70, S72, S74 and S76 in FIG. 8 are identical with Steps S10 to S12, S14, S16, S18, S20, S22, S24 and S26 in the second embodiment shown in FIG. 6, the explanation for these steps will be omitted.

In Step S78, as with the second embodiment, the extruding operation is carried out while moving the movable die 8 in accordance with a desired program, i.e., the pattern shown in FIG. 7 at (A), and simultaneously, the back pressures $P_1$ are detected by the back pressure sensor 6. Subsequently, an inquiry is made as to whether the variations in the back pressures $P_1$ fall within an allowed value, that is, Whether the amounts of the changes of the screw revolutions are adequate (Steps S80 and S82).

When the variations in the back pressures are greater than the allowed value as shown in FIG. 7 at (E), the determination in Step S82 is "NO", so that the amounts of the changes of the screw revolutions are modified again in Step S84.

Thereafter, as shown in FIG. 4 at (F), an extrusion molding is again carried out while changing the screw revolutions SP in accordance with the amounts of the changes thereof as modified (Steps S76 to S80).

If the variations in the back pressures are canceled out during this procedure, as shown in FIG. 7 at (G), the determination in Step S82 is "YES", and then, the process proceeds to Step S86.

If a signal for terminating the extrusion molding has been transmitted to the machine operation unit 26 of the extrusion molding machine 1, the determination in Step S36 is "YES", so that the extrusion molding is terminated (Step S88). If the signal for terminating the extrusion molding has not been transmitted, then, the process returns to Step S76 so that the back pressures are controlled again.

As indicated above, even if the variations in the back pressures $P_1$ are once canceled out, as shown in FIG. 7 at (G), the procedures in Steps S76 to S84 are periodically carried out. The reason is that the back pressures may change with variations in factors in the extrusion molding machine 1.

Moreover, in the first embodiment, the suitable back pressures are remarkably different in respective sections of the molded article, whereas in the second and third embodiments, the suitable back pressures are substantially equal in respective sections of the molded article. Such a difference does not result merely from the difference of the detecting points of the back pressures.

Such a difference depends on the viscosity of the molding material. For example, in the molding material having a lower viscosity like water, the suitable back pressures are constant if the cross-sectional configuration of the molded article is changed. Furthermore, the suitable back pressures are substantially constant in the case that the molded article has not a different cross-sectional configuration and has a uniform circular cross-sectional configuration over the entire length thereof, or in the case that the changes of the cross-sectional areas of the molded article are very small.

In the first embodiment, the control is carried out to modify the pattern of changes of the screw revolutions so that the magnitude and the timings of change of the back pressures are simultaneously corrected. However, as described in the second embodiment or the third embodiment, the control can be carried out to modify the pattern of changes of the screw revolutions so that the magnitude and the timings of change of the back pressures are step-wise corrected in order.

For example, it is possible to control the timings of change of the screw revolutions in accordance with the method of the second embodiment, and subsequently to control the amount of the changes of the screw revolutions in accordance with the method of the third embodiment. Further, the order of the process may be reversed.

Moreover, although the second and third embodiments exemplify that the variations in the back pressures are resulted from an inadequacy of either the timings of change of the screw revolutions or the amounts of the changes of the screw revolutions which are determined by the first extrusion molding, the present invention can reasonably be applied to a case where the variations in the back pressures are resulting from inadequacies of both of them.

In such a case, for example, it is possible to control the timings of change of the screw revolutions in accordance with the method of the second embodiment, and subsequently to control the amounts of the changes of the screw revolutions in accordance with the method of the third embodiment. Further, the order of the process may be reversed.

Further, the extrusion molding machine used to perform the present extrusion molding method is not restricted to the machine having the above described constructions, and may be a machine including different types of screw and extruding die. For example, although each of the embodiments exemplifies the extrusion molding machine of which the movable die including the two movable die halves which are movable in a direction crossing at right angles relative to each other, the number of the die parts may be one or three or more, and the arrangement thereof is not restrictive.

The present embodiments are also not restrictive with respective to another processes in the extrusion molding method, and construction, configuration, dimension, material, number and arrangement of another elements of the extrusion molding machine, and the like.

We claim:

1. In a method for extrusion molding of an article comprising extruding a molding material with an extrusion device through a die having a die opening of a configuration which is variable to change the cross-section of the article, the improvement comprising:

a) determining a desired value for a physical quantity for said molding material in the die for a particular die opening configuration;

b) determining a speed of the extrusion device at which said desired value is obtained;

c) determining a value for said physical quantity while changing the speed of the extrusion device at a predetermined rate of change so as to determine a time delay between changing of the speed and a resultant change in value for said physical quantity; and d) extruding molding material while changing the die opening configuration in accordance with a desired change in cross-section of the article and changing the speed to maintain said desired value, said changing the speed being done in advance of said changing the die opening configuration by an amount corresponding to said time delay.

2. The method of claim 1, wherein said extruding is performed with an extrusion screw and the speed of the extrusion device is changed by changing revolution speed of the extrusion screw.

3. The method of claim 2, wherein the physical quantity is inner pressure in the die and the desired value changes as the die opening configuration changes.

4. The method of claim 2 wherein the physical quantity is pressure in an area adjacent to the die opening and wherein the desired value is substantially constant as the die opening configuration changes.

5. The method of claim 1, additionally comprising continuously determining the physical quantity during said extrusion molding, and changing the speed of the extrusion device and timing of the changing so that the continuously determined value is equal to the desired value.

6. The method of claim 1, additionally comprising pulling the article extruded from the die opening during the extrusion molding.

7. The method of claim 6, wherein said pulling is carried out under constant pulling force.

8. The method of claim 6, wherein said pulling is carried out at a constant pulling speed.

* * * * *

UNITED STATES PATENT AND TRADEMARK OFFICE
CERTIFICATE OF CORRECTION

PATENT NO. : 5,567,368  
DATED : October 22, 1996  
INVENTOR(S) : YUKIMASA ANDO et al Page 1 of 2

It is certified that error appears in the above-indentified patent and that said Letters Patent is hereby corrected as shown below:

In the Drawings:

Delete drawing Fig. 12(A), and substitute therefor drawing Fig. 12(A), as shown on the attached page.

Signed and Sealed this

Twenty-fifth Day of February, 1997

Attest:

BRUCE LEHMAN

Attesting Officer

Commissioner of Patents and Trademarks